United States Patent [19]

Organ

[11] Patent Number: 4,765,779
[45] Date of Patent: Aug. 23, 1988

[54] APPARATUS AND METHOD FOR CHARGING CANISTERS WITH GRANULAR CARBON

[76] Inventor: William L. Organ, 6006 Jagger Rd., Ludington, Mich. 49431

[21] Appl. No.: 19,060

[22] Filed: Feb. 26, 1987

[51] Int. Cl.$^4$ .......................... B65G 53/28; B60P 1/60
[52] U.S. Cl. ...................................... 406/106; 406/39; 406/151; 141/1; 141/11; 210/189
[58] Field of Search .................... 406/106, 38, 39, 46, 406/77, 80, 151, 197, 50, 145, 108, 109, 122, 47, 48; 210/189; 141/1, 4, 5, 9, 11, 231

[56] References Cited

U.S. PATENT DOCUMENTS

| | | |
|---|---|---|
| 1,091,251 | 3/1914 | Stauffer . |
| 1,314,677 | 9/1919 | Linton . |
| 2,672,370 | 3/1954 | Jones et al. ............................. 406/50 |
| 2,745,888 | 5/1956 | Mertes et al. . |
| 2,793,753 | 5/1957 | Webster . |
| 2,938,751 | 5/1960 | Nogami ................................. 406/48 |
| 3,186,769 | 6/1965 | Howlett, Jr. . |
| 3,436,343 | 12/1963 | Smith . |
| 3,556,682 | 1/1971 | Sakamoto et al. ............... 406/109 X |
| 3,729,232 | 4/1973 | Sakata et al. ........................... 406/48 |
| 4,029,362 | 6/1977 | Kortenbusch ................... 406/50 X |
| 4,085,043 | 4/1978 | Ellis . |
| 4,105,549 | 8/1978 | Kakumoto et al. . |
| 4,273,652 | 6/1981 | Lucas et al. . |
| 4,685,842 | 8/1987 | Smith et al. ..................... 406/197 X |

Primary Examiner—Galen Barefoot
Assistant Examiner—James M. Kannofsky
Attorney, Agent, or Firm—Price, Heneveld, Cooper, DeWitt & Litton

[57] ABSTRACT

A method of transferring granular carbon between containers. The granular carbon is formed into a slurry and transferred between the containers using liquid pressure differential. Preferably, a negative pressure differential is used to draw the carbon slurry from a first container to a second container.

17 Claims, 2 Drawing Sheets

APPARATUS AND METHOD FOR CHARGING CANISTERS WITH GRANULAR CARBON

BACKGROUND OF THE INVENTION

The present invention relates to activated carbon filtration systems, and more particularly to apparatus and methods for transferring granulated carbon charges within such systems.

Industry and the public have become increasingly aware of the adverse consequences of contaminants in water supplies and in waste water. Government regulations have been promulgated requiring industry to remove defined toxic chemicals from waste water streams to eliminate or substantially reduce ground water contamination. Activated carbon adsorption is an effective process for the purification of water contaminated by organic compounds. Granular activated carbon (GAC) improves water quality by reducing organic contaminants, decoloring, and controlling odors and by recovering solvents. One or more carbon canisters or columns are provided in an activated carbon treatment system. The contaminated influent, such as ground water, is directed through the carbon columns in a down flow manner. Filtering can occur either in parallel or in series when multiple columns are provided.

Because the activated carbon adsorbs "toxic chemicals" as defined by government regulations, the carbon used in filtering must be handled as a toxic material. The carbon after filtering may contain one or more of the following defined toxic chemicals: hydrocarbons, solvents, volatile organic carbons, amines, aldehydes, pesticides, or PCB's.

Prior to the present invention, the carbon charges within such systems were moved or transferred by (1) first forming the carbon into a slurry and (2) pumping the slurry. Such procedure results in direct handling of the contaminated carbon and therefore requires the government-defined treatment and handling of the equipment contacting the carbon. Known methods of moving the contaminated carbon charges are therefore relatively time-consuming and expensive.

SUMMARY OF THE INVENTION

The aforementioned problems are overcome in the present invention wherein contaminated carbon charges are moved or transferred by (1) first forming the carbon into a slurry and (2) transferring the slurry using a liquid vacuum or other liquid pressure differential. The disclosed method specifically comprises the steps of (1) connecting the supplying canister and the receiving canisters by a fluid-conveying conduit, (2) filling the conduit and receiving tank with a liquid, and (3) drawing liquid from the receiving tank so that the carbon slurry is drawn through the conduit and into the receiving tank.

A carbon slurry moved according to the present invention is not directly handled by the pumping equipment. The additional special handling problems and expenses are therefore eliminated. The defined method is therefore less expensive and more easily conducted than known methods.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
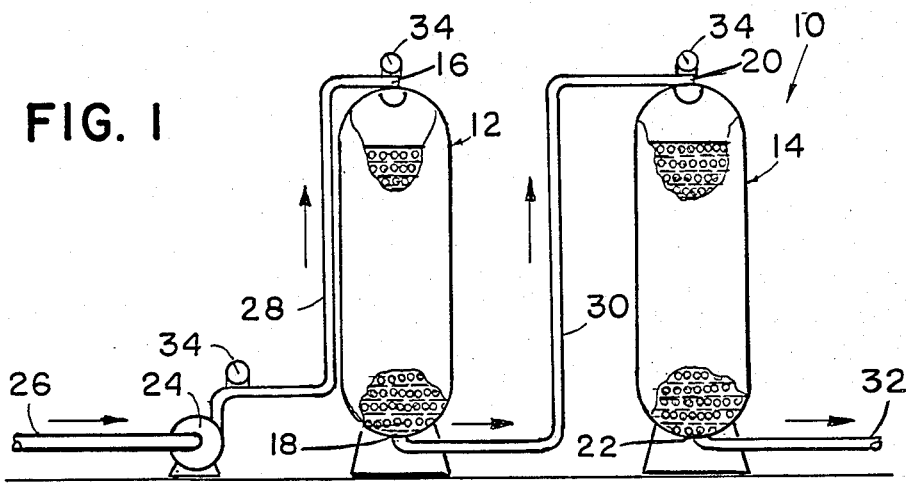
FIG. 1 is a schematic view illustrating an activated carbon adsorption system.

An activated carbon filtration system containing a carbon charge which may be changed according to the present invention is illustrated in FIG. 1 and generally designated 10. The two-stage system includes a pair of canisters or columns 12 and 14, which in the preferred embodiment are generally identical to one another. Each canister is a fiberglass pressure vessel. Each tank is elongated, being generally cylindrical in horizontal cross section, and is oriented generally vertically to include an upper end or portion and a lower end or portion. The canister 12 includes an inlet 16 at its upper end and an outlet 18 at its lower end; and the canister 14 includes an inlet 20 at its upper end and an outlet 22 at its lower end. Both of the canisters 12 and 14 are enclosed with the exception of the described inlets and outlets.

Influent, such as contaminated water, is supplied to the filtration system through the supply pipe 26. A pump 24 draws water through the supply pipe 26 and forces the water through pipe 28 into the first canister or column 12. An intermediate pipe 30 interconnects the outlet 18 of the canister 12 with the inlet 20 of the canister 14. A discharge pipe 32 is connected to the outlet 22 of the canister 14 for conveying effluent from the system. Appropriate pressure gauges (e.g. 34) and valves (not shown) are included in conventional fashion to monitor and regulate the flow of liquid through the system.

Each of the canisters or columns 12 and 14 (FIG. 1) is filled with activated granular carbon to absorb contaminants from the water filtered therethrough. Each of the canisters 12 and 14 is pressurized to prevent compaction of the granular carbon bed. In the preferred embodiment, the canisters are pressurized at 30-60 pounds per square inch; other pressures can be selected as necessary to suit a particular application.

FIGS. 2-5 illustrate the present method for changing the carbon charge within one of the canisters 12. The process will be described only in conjunction with the first canister 12, since the process for changing the charge within the second canister 14 is identical thereto.

The fresh carbon charge 39 is transported to the canister 12 in a vehicle 38. As will be described, the spent carbon charge 36 is transported away from the canister in the same vehicle. The vehicle 38 includes a pair of tanks 40 and 42, each of which has a volume generally identical to that of the canister 12. An inlet 44 is provided in the upper portion of the tank 40; and an outlet 46 is provided in the lower portion of the tank.

Similarly, an inlet 48 is provided in the upper portion of the tank 42, while an outlet or discharge 50 is provided in a lower portion of the tank. Both of tanks 40 and 42 are substantially enclosed with the exception of the described inlets and outlets.

Figure 2:
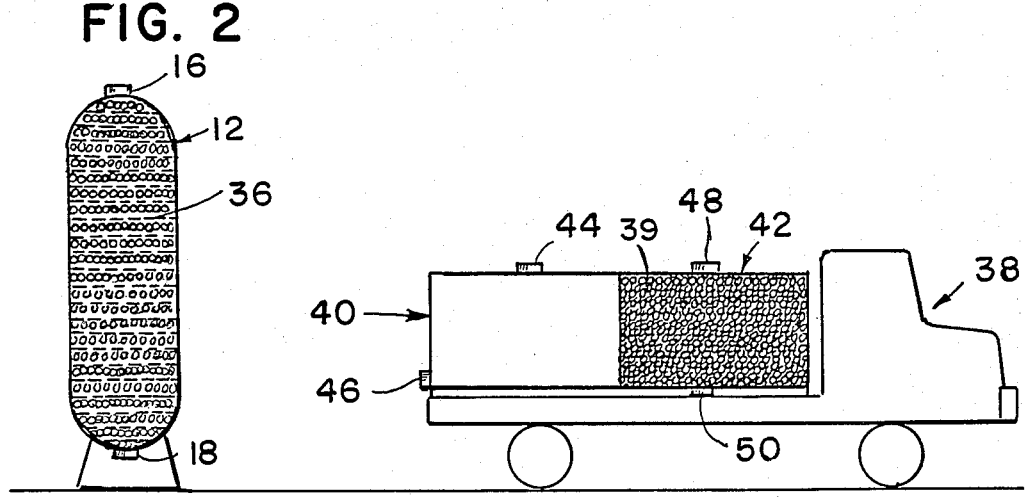
FIG. 2 is an elevational view showing a carbon canister and an exchange vehicle.

FIG. 2 illustrates the condition of the vehicle 38 and the canister 12 upon arrival of the vehicle. The contaminated carbon charge 36 is contained in slurry form in the canister 12; and the new or fresh carbon charge 38 is contained in the tank 42 in granular form. Although the new charge 38 can be transported as a slurry; this adds to the weight of the vehicle 38 and increases transportation costs. The tank 40 is empty upon arrival of the vehicle 36.

Figure 3:
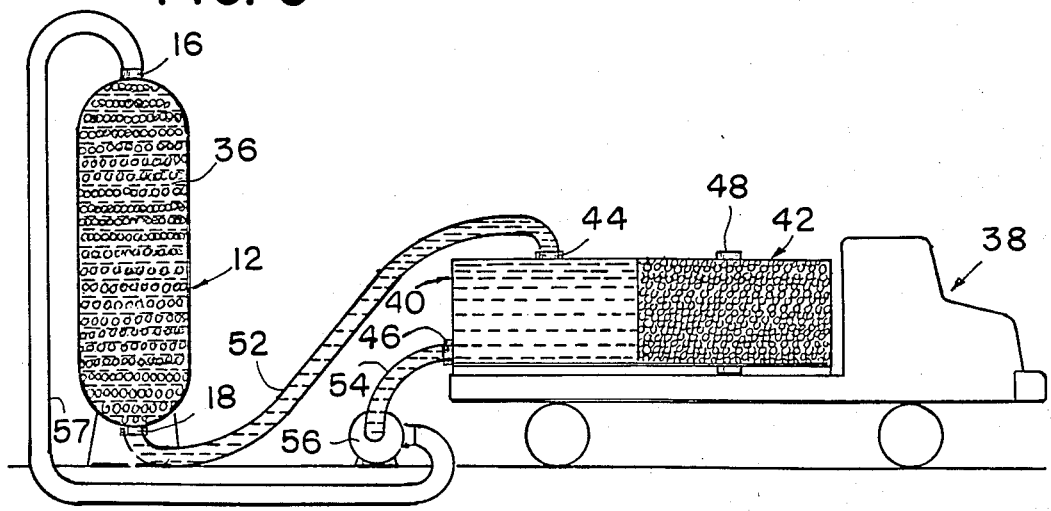
FIG. 3 shows the canister and vehicle prior to removal of the contaminated carbon charge.

FIG. 3 illustrates the initial couplings between the canister 12 and the vehicle 38. A hose, pipe, or other fluid-conveying conduit 52 is connected between the outlet 18 on the canister 12 and the inlet 44 on the tank 40. A hose, pipe, or other fluid-conveying conduit 54 is connected between the outlet 46 on the tank 40 and a pump 56. Finally, a hose 57 is also connected between the pump 56 and the inlet 16 on the canister 12. The hoses and connected canisters therefore form a closed-loop system to contain all potentially toxic materials. The hoses 52 and 54 and the tank 40 are filled with a liquid, preferably water, to evacuate all air or other gas from these components.

Figure 4:
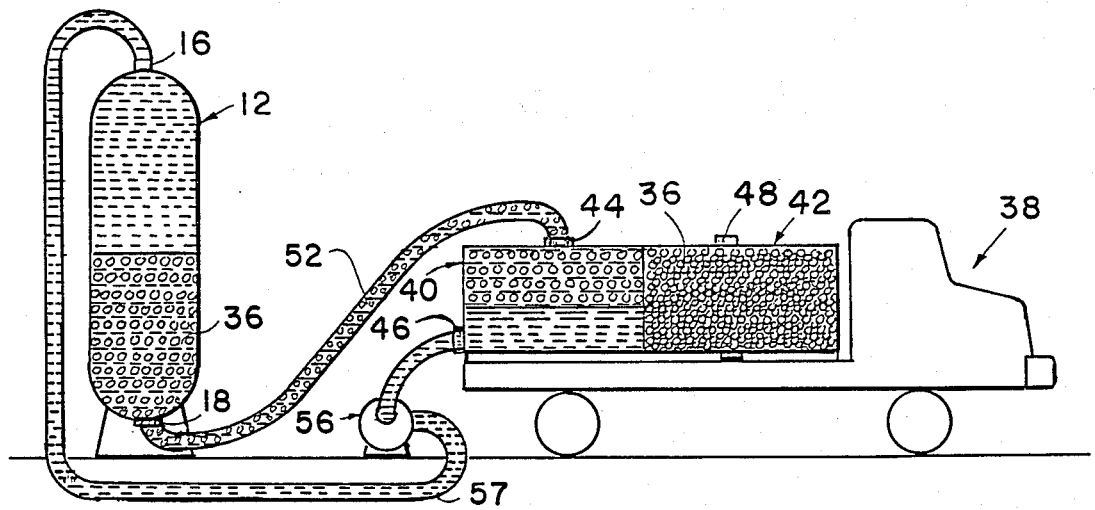
FIG. 4 shows the canister and vehicle midway through the removal of the contaminated charge from the canister.

The next step is to actuate pump 56 to draw water through the hose 54, tank 40, and hose 52. Such pumping creates a liquid vacuum or pressure differential drawing the contaminated carbon slurry 36 through the hose 52 and into the tank 40. The pumped water is directed into the upper end of the canister 12. For example, the charge has been drawn halfway into the tank 40 as illustrated in FIG. 4. At this halfway point, the contaminated carbon slurry 36 fills approximately half the canister 12, the entire hose 52, and the upper half or portion of the tank 40. Because the inlet 44 and the outlet 46 are located generally opposite one another in the tank 40 (i.e. in upper and lower portions thereof) the entire charge of water is withdrawn from the tank 40 before the carbon slurry reaches the discharge opening 46.

Figure 5:
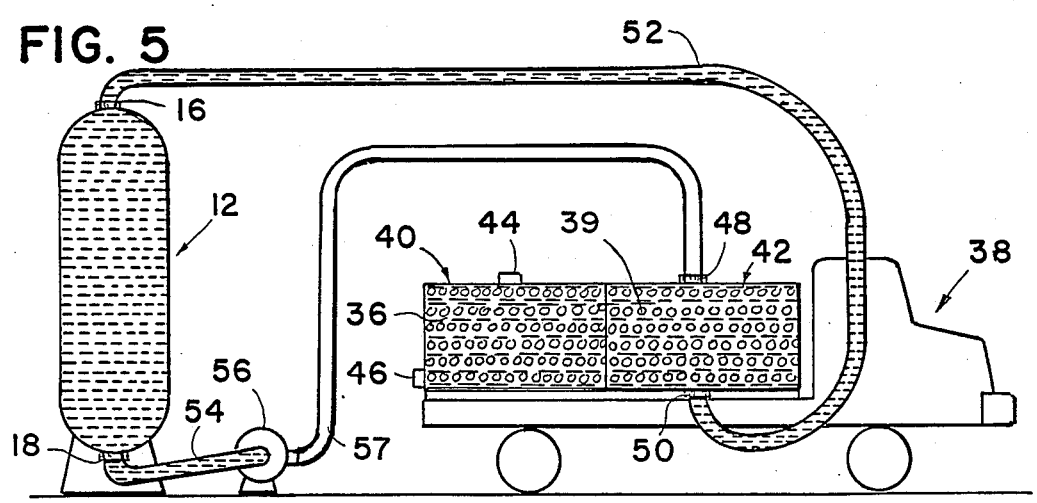
FIG. 5 shows the canister and vehicle after the contaminated charge has been removed from the canister and prior to introduction of the new charge.

Pump 56 continues pumping until the entire contaminated carbon charge 36 has been drawn into the tank 40 as illustrated in FIG. 5. The hose 52 is removed from the outlet 18 and the inlet 44 and installed between the outlet 50 on the tank 42 and the inlet 16 on the canister 12. The hose 54 is disconnected from the outlet 46 on the tank 40 and instead connected to the outlet 18 on the canister 12. The hose 57 is disconnected from the inlet 16 on the canister 12 and instead connected to the inlet 48 on the tank 42. The hoses 52 and 54 and the canister 12 are filled with a liquid, preferably water, to evacuate all air or other gas therefrom. Water is also introduced into tank 42 in sufficient quantity to form a slurry of the new carbon charge 38.

Figure 6:
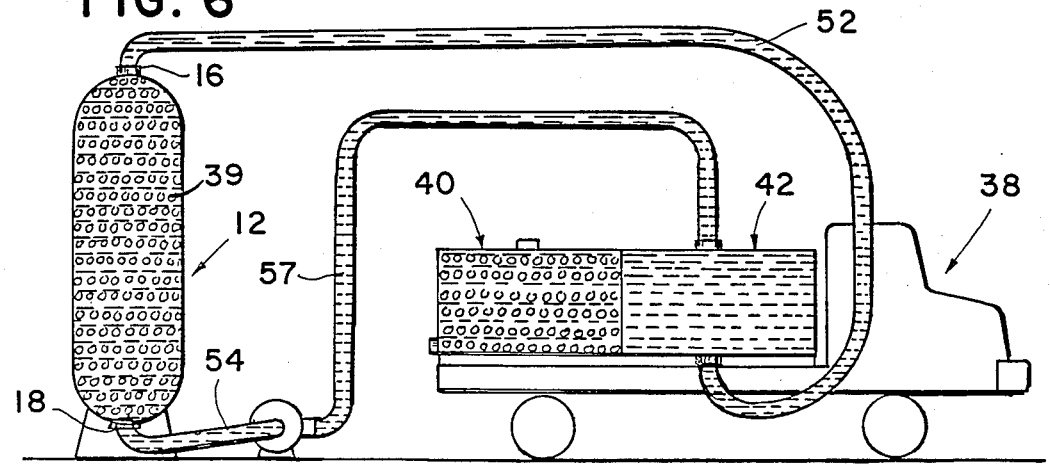
FIG. 6 shows the canister and vehicle after introduction of the new charge.

The pump 56 is actuated to draw water through the hose 54, the canister 12, and the hose 52 to create a liquid vacuum or preferred differential adequate to draw the fresh carbon slurry 38 from the tank 42. The pumped water is directed into the tank 42. Pumping continues until the entire carbon charge has been transferred to the canister 12 as illustrated in FIG. 6. Upon completion of the transfer, the hoses 52, 54, and 57 are removed from the vehicle 38 and the canister 12 and restored in the vehicle 38. The potentially toxic materials within the vehicle tanks 40 and 42 are then properly disposed of in accordance with government regulations.

The present system utilizes a negative liquid pressure differential between the drawing water and the carbon slurry to move the carbon charges. It is envisioned that the system could also be extended to utilize a positive pressure differential to force a carbon charge from a canister by pumping water into the canister at a location generally opposite the outlet. In either event, the common concept is to use a liquid pressure differential to convey a granular carbon or other particulate slurry.

The present invention eliminates the need to physically pump or otherwise handle the contaminated carbon charge. The present system is therefore believed to be safer, less expensive, simpler, and more reliable than known systems constituting a significant improvement in the safe and efficient handling of the potentially toxic carbon charge.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A method of replacing an old carbon charge in an enclosed canister comprising:
   providing a vehicle having a supply tank containing a new carbon charge and an enclosed receiving tank;
   fluidly connecting a conduit between the canister and the receiving tank;
   adding liquid as necessary to the canister to create an old carbon slurry;
   filling the conduit and receiving tank with liquid;
   drawing liquid from the receiving tank to draw the old carbon slurry into the receiving tank;
   removing the conduit from the receiving tank;
   fluidly connecting a conduit between the supply tank and the canister;
   adding liquid to the supply tank as necessary to create a new carbon slurry;
   filling the canister and conduit with liquid;
   drawing liquid from the canister to draw the new carbon slurry into the canister, whereby the old carbon charge is transferred from the canister to the vehicle and the new carbon charge is transferred from the vehicle to the canister.

2. A method as defined in claim 1 further comprising introducing the liquid drawn from the canister into the supply tank, thereby forming a closed-loop system.

3. A method as defined in claim 1 wherein:
   in said first drawing step liquid is drawn from the receiving tank at a location generally opposite the conduit; and
   in said second drawing step liquid is drawn from the canister at a location generally opposite the conduit.

4. A method as defined in claim 3 wherein:
   in said first connecting step the conduit is connected to an upper portion of the receiving tank and liquid is drawn from a lower portion of the receiving tank; and
   in said second connecting step the conduit is connected to an upper portion of the canister and liquid is drawn from a lower portion of the canister.

5. A method of charging a receiving tank with a granular material comprising:
- providing the granular material in a supply tank having an outlet;
- connecting a liquid-conveying means between the supply tank outlet and an inlet on the receiving tank;
- filling the receiving tank and the liquid-conveying means with a liquid;
- adding liquid to the supply tank as necessary to create a slurry;
- removing the liquid from the receiving tank thereby drawing the slurry through the liquid conveying means and into the receiving tank.

6. A method as defined in claim 5 wherein the receiving tank is substantially enclosed with the exception of the inlet and an outlet.

7. A method as defined in claim 6 wherein the receiving tank is elongated and oriented generally vertically, and further wherein the receiving tank inlet and outlet are located at generally opposite ends of the receiving tank.

8. A method as defined in claim 7 wherein the inlet is located in an upper portion of the receiving tank and the receiving tank outlet is located in a lower portion of the receiving tank.

9. A method as defined in claim 5 wherein the receiving tank is elongated and oriented generally vertically, and further wherein the receiving tank inlet and outlet are located at generally opposite ends of the receiving tank.

10. A method as defined in claim 9 wherein the inlet is located in an upper portion of the receiving tank and the receiving tank outlet is located in a lower portion of the receiving tank.

11. A method as defined in claim 5 wherein the material is carbon.

12. A method as defined in claim 5 further comprising returning the liquid drawn from the receiving tank to the supply tank.

13. A method of transferring particulate matter from a first substantially enclosed container, said method comprising:
- adding liquid as necessary to the first container to create a slurry of the particulate matter;
- connecting a fluid-conveying conduit between the first container and a second substantially enclosed container;
- filling the conduit and the second container with liquid; and
- drawing liquid from the second container to draw the slurry through the conduit from the first container causing the slurry to exit the first container.

14. A method as defined in claim 13 wherein the particulate matter is carbon.

15. A method as defined in claim 13 wherein the conduit is connected to a first portion of the second container, and further wherein liquid is drawn from a second portion of the second container remote from the first portion.

16. A method as defined in claim 15 wherein the first portion is the upper portion and the second portion is the lower portion.

17. A method as defined in claim 16 wherein the second container is elongated and oriented generally vertically.

* * * * *